(12) United States Patent
Van Wyk et al.

(10) Patent No.: US 8,098,805 B2
(45) Date of Patent: Jan. 17, 2012

(54) SYSTEM AND METHOD FOR PROVIDING TELEPHONE CALL NOTIFICATION AND MANAGEMENT IN A NETWORK ENVIRONMENT

(75) Inventors: Ryan Van Wyk, St. Louis, MO (US); Brian Bearden, Webster Grove, MO (US); Scott Steinbrueck, St. Louis, MO (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 240 days.

(21) Appl. No.: 12/419,928

(22) Filed: Apr. 7, 2009

(65) Prior Publication Data

US 2009/0214007 A1 Aug. 27, 2009

(51) Int. Cl.
H04M 1/56 (2006.01)
H04M 15/06 (2006.01)

(52) U.S. Cl. ........... 379/142.16; 379/93.23; 379/142.01; 379/142.07

(58) Field of Classification Search ............... 379/88.12, 379/88.13, 88.2, 88.21, 93.17, 93.23, 142.01, 379/142.04, 142.07, 142.08, 142.15, 142.16, 379/142.17, 245, 246, 247; 455/403, 412.2, 455/415, 550.1, 556.1; 370/352, 353, 354, 370/355, 356, 401
See application file for complete search history.

(56) References Cited

U.S. PATENT DOCUMENTS

| | | | |
|---|---|---|---|
| 5,825,862 A | 10/1998 | Voit et al. | |
| 6,052,444 A | 4/2000 | Ferry | |
| 6,996,211 B2 | 2/2006 | Reynolds et al. | |
| 7,515,698 B2 | 4/2009 | Wyk et al. | |
| 2002/0104095 A1 | 8/2002 | Nguyen et al. | |
| 2003/0016800 A1 | 1/2003 | Fukuda | |
| 2003/0190024 A1 | 10/2003 | Ju et al. | |
| 2003/0204592 A1 | 10/2003 | Crouse-Kemp et al. | |
| 2004/0037403 A1 | 2/2004 | Koch | |
| 2004/0098507 A1 | 5/2004 | Thubert et al. | |
| 2005/0111653 A1 | 5/2005 | Joyce et al. | |
| 2005/0152525 A1 | 7/2005 | Kent | |
| 2005/0210394 A1 | 9/2005 | Crandall et al. | |
| 2005/0277406 A1 | 12/2005 | Diroo et al. | |
| 2006/0088149 A1 | 4/2006 | Sung | |
| 2007/0115389 A1* | 5/2007 | McCarthy et al. | ............ 348/461 |

(Continued)

FOREIGN PATENT DOCUMENTS

WO WO-2007/123887 A3 11/2007

(Continued)

OTHER PUBLICATIONS

U.S. Appl. No. 11/405,846 Response filed Sep. 4, 2008 to Non Final Office Action mailed Jun. 16, 2008, 10 pgs.

(Continued)

*Primary Examiner* — Binh Tieu (74) *Attorney, Agent, or Firm* — Andrew Gust; Guntin Meles & Gust, PLC (57) ABSTRACT

Various embodiments of the disclosed subject matter provide methods and systems to receive an incoming call message via a data interface upon activation of a trigger established with a voice communication network and activated when the voice communication network receives an incoming call to a destination identified by a pre-determined subscriber account; generate a call notification in response to the incoming call message; obtain a list of set-top boxes corresponding to the pre-determined subscriber account; and route the call notification to the set-top boxes on the list.

25 Claims, 8 Drawing Sheets

U.S. PATENT DOCUMENTS

| | | | |
|---|---|---|---|
| 2007/0118857 A1* | 5/2007 | Chen et al. | 725/61 |
| 2007/0121599 A1* | 5/2007 | Soo et al. | 370/356 |
| 2007/0121854 A1* | 5/2007 | Soo et al. | 379/142.01 |
| 2007/0143831 A1* | 6/2007 | Pearson et al. | 726/5 |
| 2007/0250845 A1* | 10/2007 | Walter et al. | 725/10 |
| 2007/0250884 A1* | 10/2007 | Qiu et al. | 725/106 |
| 2007/0263808 A1 | 11/2007 | Van et al. | |
| 2007/0263853 A1* | 11/2007 | Pearson et al. | 379/413.03 |
| 2008/0109839 A1* | 5/2008 | Bruce et al. | 725/25 |
| 2008/0125098 A1* | 5/2008 | Bruce et al. | 455/414.1 |
| 2008/0310408 A1* | 12/2008 | Thompson et al. | 370/386 |

FOREIGN PATENT DOCUMENTS

| | | | |
|---|---|---|---|
| WO | WO-2007123887 A2 | 11/2007 | |

OTHER PUBLICATIONS

U.S. Appl. No. 11/405,846 Supplemental Notice of Allowability mailed Jan. 7, 2009, 5 pgs.

U.S. Appl. No. 11/405,846 Notice of Allowance mailed Nov. 14, 2008, 7 pgs.

U.S. Appl. No. 11/405,846 Supplemental Notice of Allowability mailed Dec. 29, 2008, 3 pgs.

International Application Serial No. PCT/US07/09340 International Search Report mailed Sep. 4, 2008, 5 pgs.

International Application Serial No. PCT/US07/09340 Written Opinion mailed Sep. 4, 2008, 5 pgs.

"IPTV and IP Multimedia Solutions for Service Providers", (observed Jan. 20, 2006), 2 pgs.

"U.S. Appl. No. 11/405,846, Non-Final Office Action mailed Jun. 16, 2008", OARN, 11 pgs.

Canadian Intellectual Property, Office, "Requisition by Examiner in Accordance with Subsection 30(2)", in Canadian Application No. 2,649,669, by Patent Examiner Kristy Hyam, dated Jun. 22, 2011, 3 pages.

* cited by examiner

SYSTEM AND METHOD FOR PROVIDING TELEPHONE CALL NOTIFICATION AND MANAGEMENT IN A NETWORK ENVIRONMENT

TECHNICAL FIELD

The disclosed subject matter relates to the field of network and telephone communications, and more particularly to methods and systems including providing call notification and management in a network environment.

RELATED APPLICATIONS

This application is related to U.S. application Ser. No. 11/405,846, entitled, "SYSTEM AND METHOD FOR PROVIDING TELEPHONE CALL NOTIFICATION MANAGEMENT IN A NETWORK ENVIRONMENT", filed on Apr. 17, 2006, issued as U.S. Pat. No. 7,515,698 on date herewith, and assigned to SBC Knowledge Ventures, L.P.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2006, SBC Knowledge Ventures L.P. All Rights Reserved.

BACKGROUND

In recent years, telephone network providers have been integrating services to support voice, data, and video communication. And there have also been attempts to integrate wireless telephone networks with land-based in telephone networks. The result has been a variety of new service offerings such as voice over IP (VoIP) and IPTV. However, the full integration of these service offerings has yet to be realized. For example, conventional systems have not been able to flexibly support the notification, configuration, and management of telephone calls using a television interface and an IP network.

Some conventional set-top box systems have provided limited support for caller ID notifications using a television interface and a directly-connected traditional telephony network line (e.g. TDM). Because these conventional systems depend upon a direct telephone line connection, these systems cannot provide a flexible and configurable solution for the notification, configuration, and management of telephone calls using a television interface and an IP network.

Thus, an improved system and method for the notification, configuration, and management of telephone calls in a network environment using a television interface is needed.

DETAILED DESCRIPTION

In the following detailed description, reference is made to the accompanying drawings that form a part hereof, and in which are shown by way of illustration, specific embodiments in which the disclosed subject matter can be practiced. It is understood that other embodiments may be utilized and structural changes may be made without departing from the scope of the disclosed subject matter. The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

As described further below, according to various example embodiments of the disclosed subject matter described herein, there is provided an improved system and method for the notification, configuration, and management of telephone calls in a network environment using a television interface.

Figure 1:
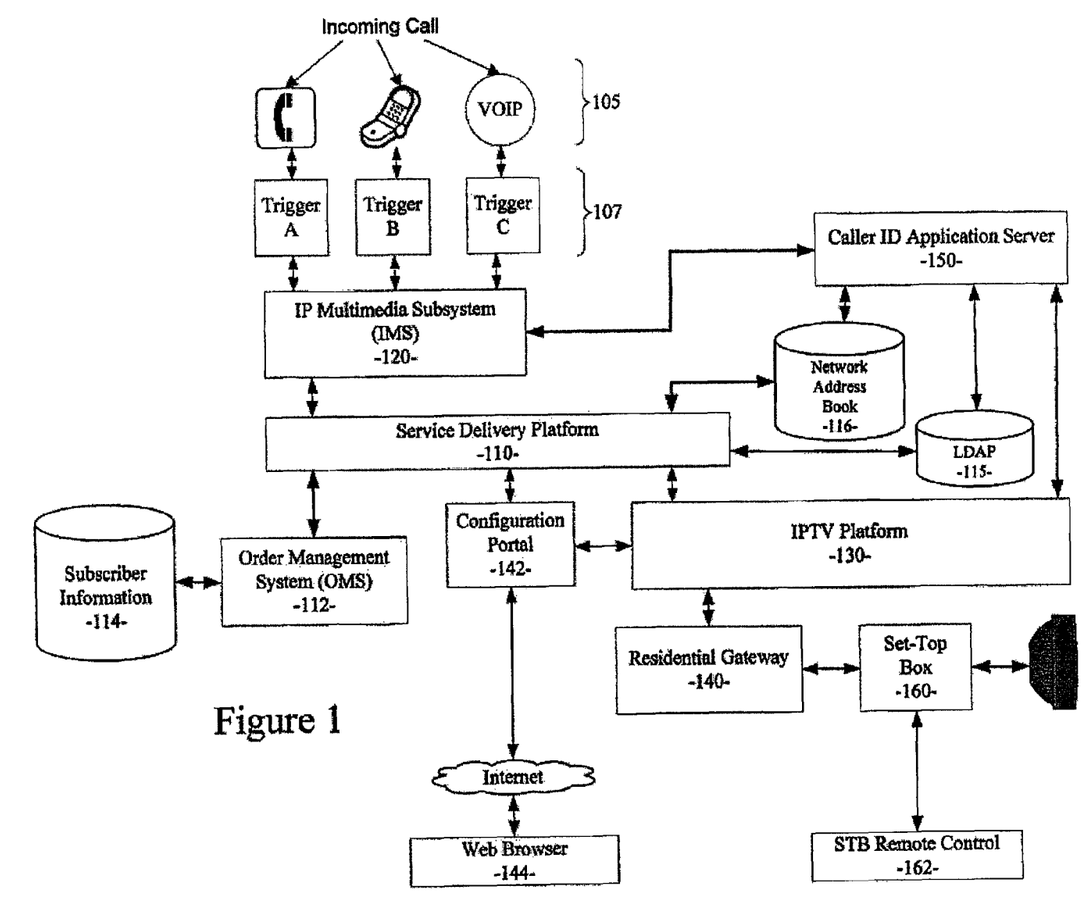
FIG. 1 illustrates a VoIP network and an IPTV network in accordance with one example embodiment of the disclosed subject matter hereof.

Example embodiments of the disclosed subject matter, as illustrated in the block diagram of FIG. 1, provide a network-based system and a methodology for: establishing a trigger with a voice communication network, the trigger being activated when the telephone network receives an incoming call to a destination identified by a pre-determined subscriber account, receiving an incoming call message via a data interface upon activation of the trigger, generating a call notification in response to the incoming call message, obtaining a list of set-top boxes corresponding to the pre-determined subscriber account; and routing the call notification to the set-top boxes on the list. Referring to FIG. 1, an incoming telephone call is received on one of a variety of conventional voice communication (e.g. telephone) networks 105, which can include conventional land-based telephone networks, wireless or cellular telephone networks, voice over IP (VoIP) networks, satellite telephone, and the like. Each of these conventional voice communication networks provide capabilities for associating triggers 107 with a particular incoming telephone call based on the subscriber account being accessed (e.g. the telephone number (TN) being dialed).

For conventional land-based telephone networks, Trigger A shown in FIG. 1 can be implemented as follows. The TDM network receives an incoming call at the SSP (Service switching point). The trigger in the SSP can be an AIN (Advanced Intelligent Network) message to an OSA (Open Service Access) SCS (Service Capability Server) that initiates an event to the Caller ID application server 150. The OSA SCS responds with a AIN message back to the SSP as an indicator to continue with the call setup.

For a conventional wireless or cellular telephone network, Trigger B shown in FIG. 1 can be implemented as follows. The GSM network receives an incoming call at the MSC (Mobile Switching Center). The trigger in the MSC can be a TCAP (Transaction Capabilities Application Part) message to an OSA (Open Service Access) SCS (Service Capability Server) that initiates an event to the Caller ID application server 150. The OSA SCS responds with a TCAP message back to the MSC as an indicator to continue with the call setup.

For a conventional voice-over-IP (VoIP) network, Trigger C shown in FIG. 1 can be implemented as follows. The IP multimedia subsystem (IMS) network receives an incoming call at the CSCF (Call Session Control Function). The trigger in the CSCF can be a session initiation protocol (SIP) message to an OSA (Open Service Access) SCS (Service Capability Server) that initiates an event to the Caller ID application server 150. The OSA SCS responds with a SIP message back to the CSCF as an indicator to continue with the call setup.

These conventional triggers 107 enable the activation of special functionality through the IP multimedia subsystem (IMS) 120 as will be described in more detail below.

IP multimedia subsystem (IMS) 120 is a conventional multimedia services architecture provided in a unified system that supports a wide range of services enabled by the flexibility of session initiation protocol (SIP). IMS 120, an implementation of which is available from Lucent Technologies, supports multiple applications servers to provide traditional telephony services and non-telephony services such as instant messaging, push to talk, video streaming, multimedia messaging, and the like. When a trigger 107 is activated upon the receipt of an incoming call to a particular telephone number, trigger 107 sends a message to IMS 120 using the conventional session initiation protocol (SIP). In particular, a SIP Invite message is sent to IMS 120. The SIP Invite message notifies IMS 120 that a telephone call to a particular predefined telephone number was received on one of the telephone networks 105. The SIP Invite message sent to IMS 120 provides several dead items including the logical recipient of the request, the logical initiator of the request, or a session sequence number, a caller ID number, a called number, a date and time, and routing information, among other information items.

In an embodiment, IMS 120 is coupled to a service delivery platform 110 and a caller ID application server 150. Service delivery platform 110 is a conventional system for linking several service providing systems in a networked computer environment to provide converged services. An implementation of a service delivery platform 110 is available from IBM Corporation as developed under contract with SBC Communications, Inc. (now AT&T Knowledge Ventures, Inc.). Caller ID application server 150 is a novel system incorporating most of the innovative functionality provided by various embodiments. As will be described in more detail below, caller ID application server 150 receives a message from IMS 120 when a trigger 107 detects an incoming call on one of the telephone networks 105.

Service delivery platform 110 is also coupled to order management system (OMS) 112. OMS 112 is coupled to a subscriber information database 114. OMS 12 represents an order management system which provides provisioning capabilities in a converged service environment. Subscriber information database 114 is used for storage and retrieval of telephone subscriber information. Such subscriber information can include the subscriber telephone number(s), set-top box identifiers, VoIP information, subscriber account information, incoming call destination information, a default subscriber configuration, subscriber personal, financial, and demographic information, and the like. This conventional subscriber information is typically created when a new subscriber orders telephone, cable, Internet connection, video on demand, or other broadcast, communication, or computing services from a conventional network provider.

Service delivery platform 110 is also coupled to database 115. In various embodiments described herein, database 115 is implemented as a light-weight directory access protocol server (LDAP). LDAP 115 is used for the storage and low-latency retrieval of a portion of the subscriber information maintained in database 114. The use of LDAP 115 in various embodiments will be described in more detail below. It will be apparent to those of ordinary skill in the art that LDAP 115 could equivalently be implemented as a networked database, internal data storage device, or the like.

Service delivery platform 110 is also coupled to network address book 116. Network address book 116 is used for the storage of subscriber-specific contact information. In various embodiments described herein, network address book 116 is used to map caller ID information to a name or identity that is more familiar to the subscriber. The more familiar name/identity can then be used in the call notification as will be described in more detail below.

Service delivery platform 110 is also coupled to Internet protocol television (IPTV) platform 130. IPTV 130 is a conventional system and method of delivering broadcast television and on-demand rich media content that uses an Internet protocol network as the medium. Conventional IPTV 130 is commonly used as a primary mechanism for carriers, such as telephone companies, and cable and satellite TV carriers, to deliver television to mass audiences over existing communications IP infrastructures. One such IPTV platform is available from Microsoft Corp. and can be implemented with the Microsoft Windows media platform. As shown in FIG. 1, IPTV platform 130 is interposed between service delivery platform 110 and residential Gateway 140. IPTV platform 130 can also be directly coupled to caller ID application server 150. The conventional IPTV platform 130, such as an implementation provided by Microsoft, includes a remote desktop protocol (RDP) with which a user can make command selections and provide data input using a television/set-top box (STB) remote control device 162.

Residential Gateway 140 is a conventional device for residential or commercial use to enable broadband access to the Internet. A conventional desktop computer can be coupled to Gateway 140 and thereby obtain access to the World Wide Web using conventional interfaces and protocols. Using the Web access provided through Gateway 140 and a conventional web browser 144, a user can visit various conventional web sites, including a particular web site that can be used as a configuration portal 142. Configuration portal 142 provides a means for a user to configure various parameters and functionality provided in various embodiments described herein.

Residential Gateway 140 can also be coupled with conventional set-top box 160. Using IPTV platform 130 in combination with set-top box 160, video content can be displayed on a monitor coupled to set-top box 160. The configuration and use of IPTV platform 130 through residential Gateway 140 and set-top box 160 to present video content on a television monitor is well known to those of ordinary skill in art. Set-top box 160 also provides conventional functionality for interfacing with a television/STB remote control device 162. In various embodiments described herein, television/STB remote device 162 can be used in combination with the remote desktop protocol (RDP) of IPTV 130 to configure various parameters and functionality provided in various embodiments described herein.

In the example embodiment shown in FIG. 1, Caller ID application server 150 is coupled to IMS 120, LDAP 115, Network Address Book 116, and IPTV platform 130. As will be described in more detail below in reference to several example embodiments, caller ID application server 150 in combination with the example system of one embodiment illustrated in FIG. 1 provides for caller ID and call waiting notifications displayed on a conventional television set/monitor. Caller ID application server 150 further provides a Web interface and a television/STB remote device interface for configuration and command selection of the caller ID functionality. In one embodiment, this web interface is provided by a user configuration portal 142. The user can access the user configuration portal 142 via the Internet using a conventional web browser 144 or via the television and the STB remote control device 162. The user configuration portal 142 provides a user interface presentation to the user and sends messages to the SDP 110 to change the user's IPTV CallerID configuration. SDP 110 interfaces with LDAP 115 to maintain the user's CallerID configuration. In various embodiments, caller ID and call waiting notifications include the display of the incoming telephone number, the name/identity of the caller, called telephone number, and user prompts and to respond to or configure notifications, dismiss notifications, forward incoming calls to voicemail or other telephone numbers, activate or deactivate "do not disturb" functionality, and activate or deactivate "find me" or "follow me" functionality. Various embodiments of caller ID application server 150 also provide a means to route an incoming call to a specific set-top box or all set-top boxes in a residence or other location based on preconfigured user preferences. For example, calls may be selectively routed depending upon the identity of the caller, the number being called, the time of day, and based on the content currently being viewed on the television monitor connected to a specific set-top box. The caller ID notification can be generated for multiple telephone lines at a particular location as configured by the user. For example, a user can configure caller ID notifications for a particular location that may have a mix of land-based telephone accounts, wireless telephone accounts, or VoIP accounts. Further, various embodiments described herein provide the user with a means to configure a network address book 116, which is used to customize caller ID notifications with caller names/identities as configured by the user.

As will be described in more detail below in reference to several example embodiments, caller ID application server 150 in combination with the example system of one embodiment illustrated in FIG. 1 provides for 1) establishing a trigger with a telephone network, the trigger being activated when the telephone network receives an incoming call to a predetermined telephone number, 2) receiving an incoming call message via a data interface upon activation of the trigger, 3) generating a call notification in response to the incoming call message, 4) obtaining a list of set-top boxes corresponding to the pre-determined telephone number, and 5) routing the call notification to the set-top boxes on the list. Referring to FIGS. 2-7, flow diagrams illustrate processing performed for an example embodiment.

Figure 2:
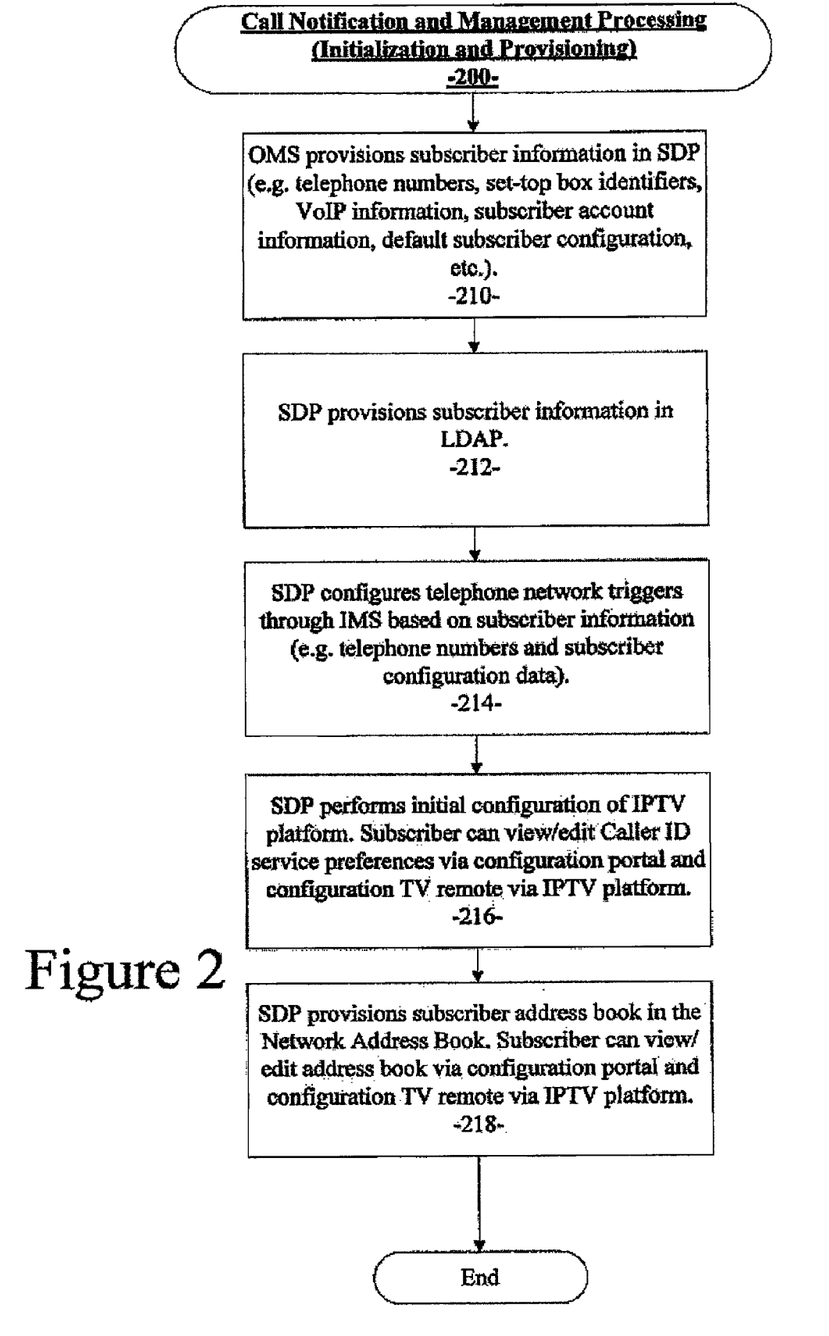
FIGS. 2-7 illustrate various example embodiments of processing operations performed for initializing the system and for handling an incoming telephone call in accordance with one example embodiment of the disclosed subject matter hereof.
Figure 3:
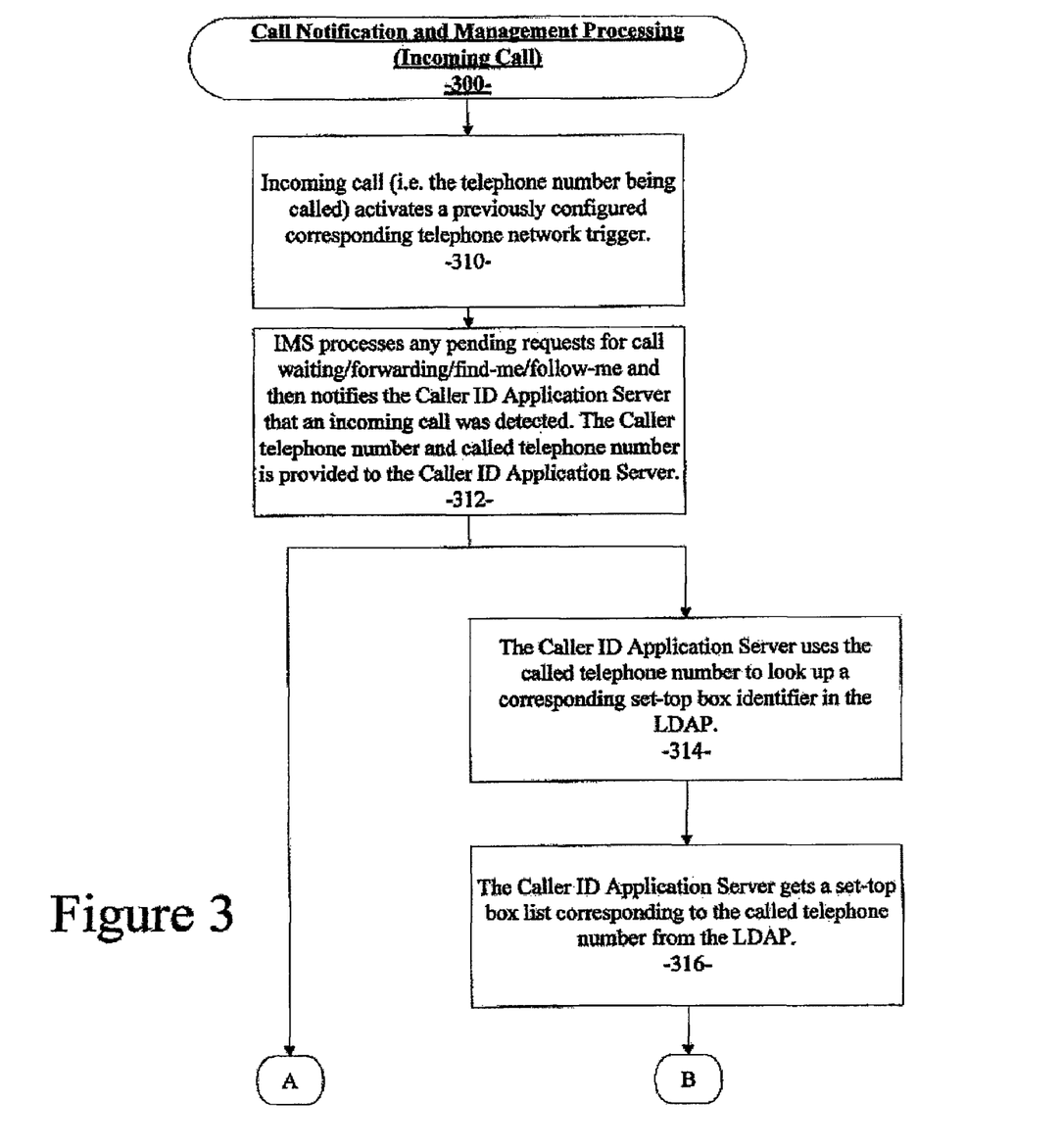

FIG. 2 illustrates the initialization and provisioning steps performed for the call notification and management processing of an embodiment. As part of the initialization and provisioning process, OMS 112 provisions subscriber information in service delivery platform 110 (processing block 210). This subscriber information can include telephone numbers, set-top box identifiers, VoIP information, subscriber account information, and default subscriber configurations for a particular user/subscriber. In turn, service delivery platform 110 provisions all or a portion of this subscriber information in LDAP 115 (processing block 212). Additionally, service delivery platform 110 configures telephone network triggers 107 through IMS 120 based on the subscriber information received from OMS 112 (processing block 214). The configuration of telephone network triggers 107 includes providing a specification of the called telephone numbers that should be monitored on a particular telephone network 105. Additionally, the configuration of telephone network triggers 107 includes providing information necessary to populate a SIP Invite message with necessary data. Service delivery platform 110 also performs initial configuration of IPTV platform 130 (processing block in 216). Once IPTV platform 130 is configured, a subscriber can then view and edit caller ID service preferences via configuration Web portal 142 and/or STB remote 162 via IPTV platform 130. The subscriber configurable service preferences include those caller ID and call waiting services described above. Finally, in processing block 218, service delivery platform 110 provisions subscriber address book information in network address book 116. At this point, the subscriber can view or edit his/her address book via the Web configuration portal 142 and/or STB remote 162 via the IPTV platform 130. Initialization in the example embodiment illustrated in FIG. 2 then terminates at the End bubble.

Figure 4:
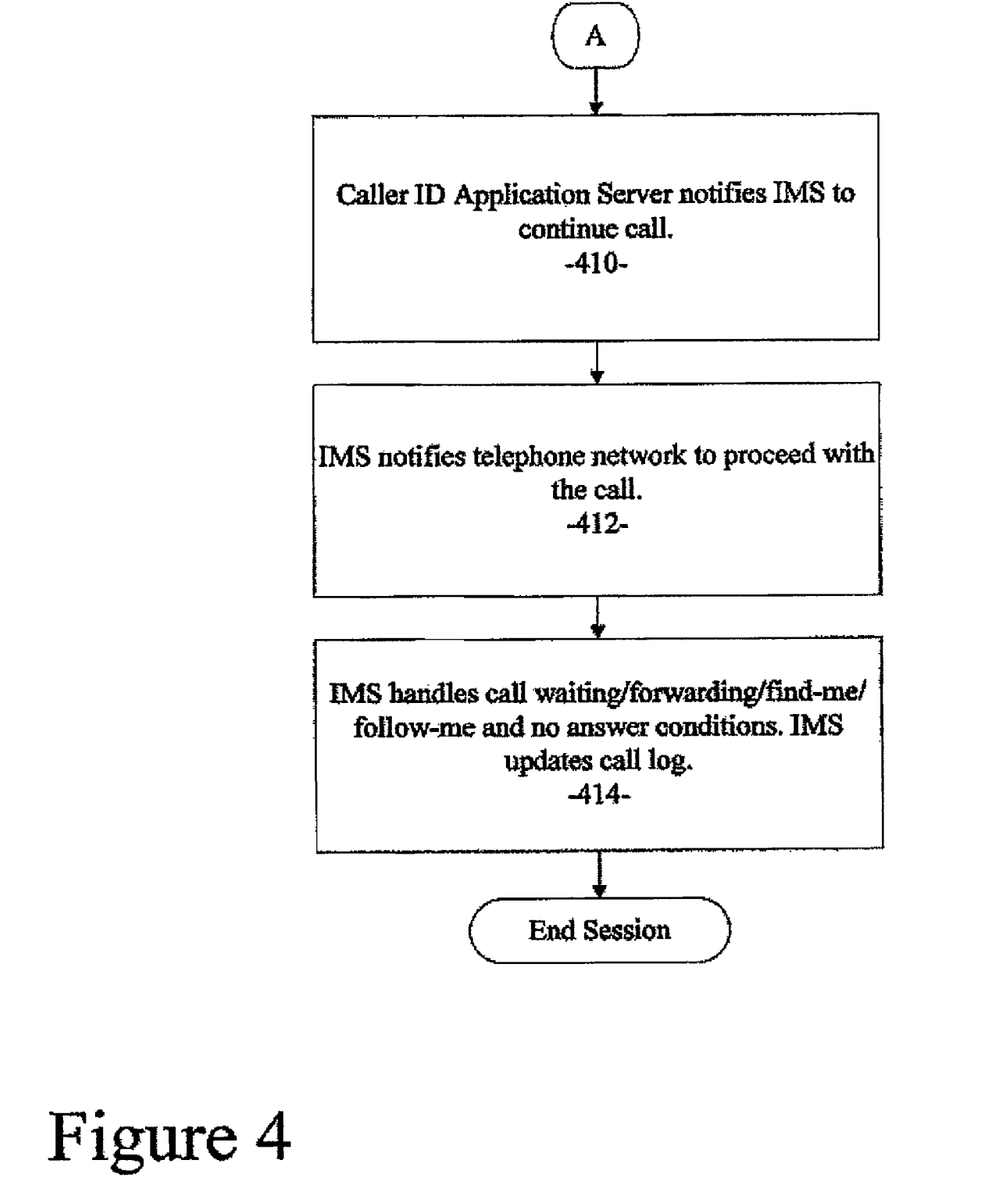

Referring now to FIGS. 3-7, the processing performed by an example embodiment for an incoming telephone call is illustrated. As shown starting at processing block 310 in FIG. 3, an incoming telephone call activates a previously configured corresponding telephone network trigger 107. The network trigger 107 is activated, based upon the telephone number being called. In processing block 312, IMS 120 processes any pending requests for call waiting, call forwarding, find me/follow me functions, and the like for the called telephone number. IMS 120 then notifies caller ID application server 150 that an incoming call was detected. In one embodiment, IMS 120 uses a SIP invite message to notify caller ID application server 150 that an incoming call was detected. As part of the SIP invite message, IMS 120 provides the called telephone number, and the caller (i.e. caller-ID) telephone number to caller ID application server 150. Upon completion of the processing in block 312, processing for the incoming telephone call continues for the example embodiment in parallel operations at bubble A as illustrated in FIG. 4 and at processing block 314.

In processing block 314, caller ID application server 150 uses the called telephone number to look up a corresponding set-top box identifier in the LDAP 115. In response to the called telephone number look up, caller ID application server 150 receives a list of set-top box identifiers corresponding to the called telephone number from LDAP 115 (processing block 316). The list of set-top box identifiers were previously configured for the particular subscriber associated with the called telephone number. As described above, a subscriber can have multiple set-top boxes at a location corresponding to the called telephone number. Additionally as described above, the called telephone number associated with the subscriber can be a land line telephone, a wireless telephone, or a VoIP number. Upon completion of the processing in block 316, processing for the incoming telephone call continues for the example embodiment at bubble B illustrated in FIG. 5.

Referring to FIG. 4, processing for handling an incoming telephone call in an example embodiment is illustrated starting at bubble A. In processing block 410, caller ID application server 150 notifies IMS 120 to enable the incoming call to proceed as normal through the telephone network. In processing block 412, IMS 120 notifies the telephone network 105 to proceed as normal with the incoming telephone call. In processing block 414, IMS 120 handles call waiting, call forwarding, find me/follow me functions, and no answer conditions. Further, IMS 120 updates a call log. Processing by IMS 120 then ends for the incoming call session.

Figure 5:
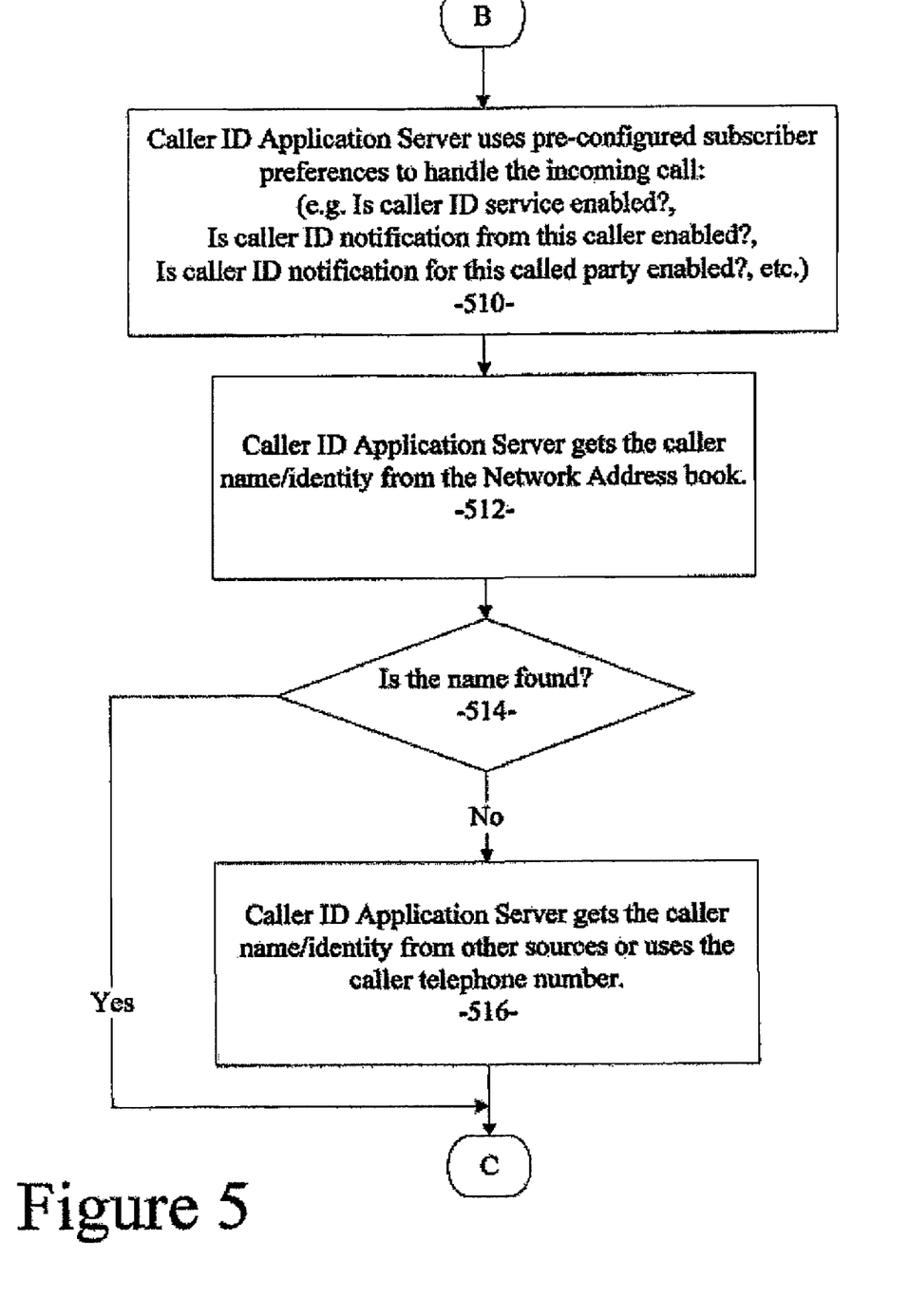

In parallel with processing performed by IMS 120, caller ID application server 150 performs additional functions in response to the incoming telephone call as illustrated in FIG. 5. Referring to FIG. 5, caller ID application server 150 can use subscriber configuration data and preferences obtained from LDAP 115 to selectively handle the caller ID notification associated with the incoming call (processing block 512). For example, caller ID application server 150 can determine if caller ID notification service is enabled for the subscriber associated with the called telephone number. Additionally, caller ID application server 150 can use subscriber preference data to determine if caller ID notification associated with this particular caller or the particular called telephone number is enabled. Assuming for the purposes of this description of the example embodiment that caller ID notification is selectively enabled, caller ID application server 150 obtains the caller name/identity from a pre-configured subscriber address book retained in network address book 116. (processing block 512). The preconfigured subscriber address book can be used to associate the caller ID information received from IMS 120 with the name or identity of a corresponding caller. If the name of the caller is found in the preconfigured subscriber address book, processing for the incoming call notification continues at the bubble C illustrated in FIG. 6. If the name of the caller is not found in the preconfigured subscriber address book in network address book 116, one embodiment attempts to obtain the caller name or identity from other sources. If the caller name or identity is still not found using other sources, the caller telephone number from the caller-ID information received from IMS 120 is used to identify the incoming call (processing block 516). Processing for the incoming call notification continues at the bubble C illustrated in FIG. 6.

Figure 6:
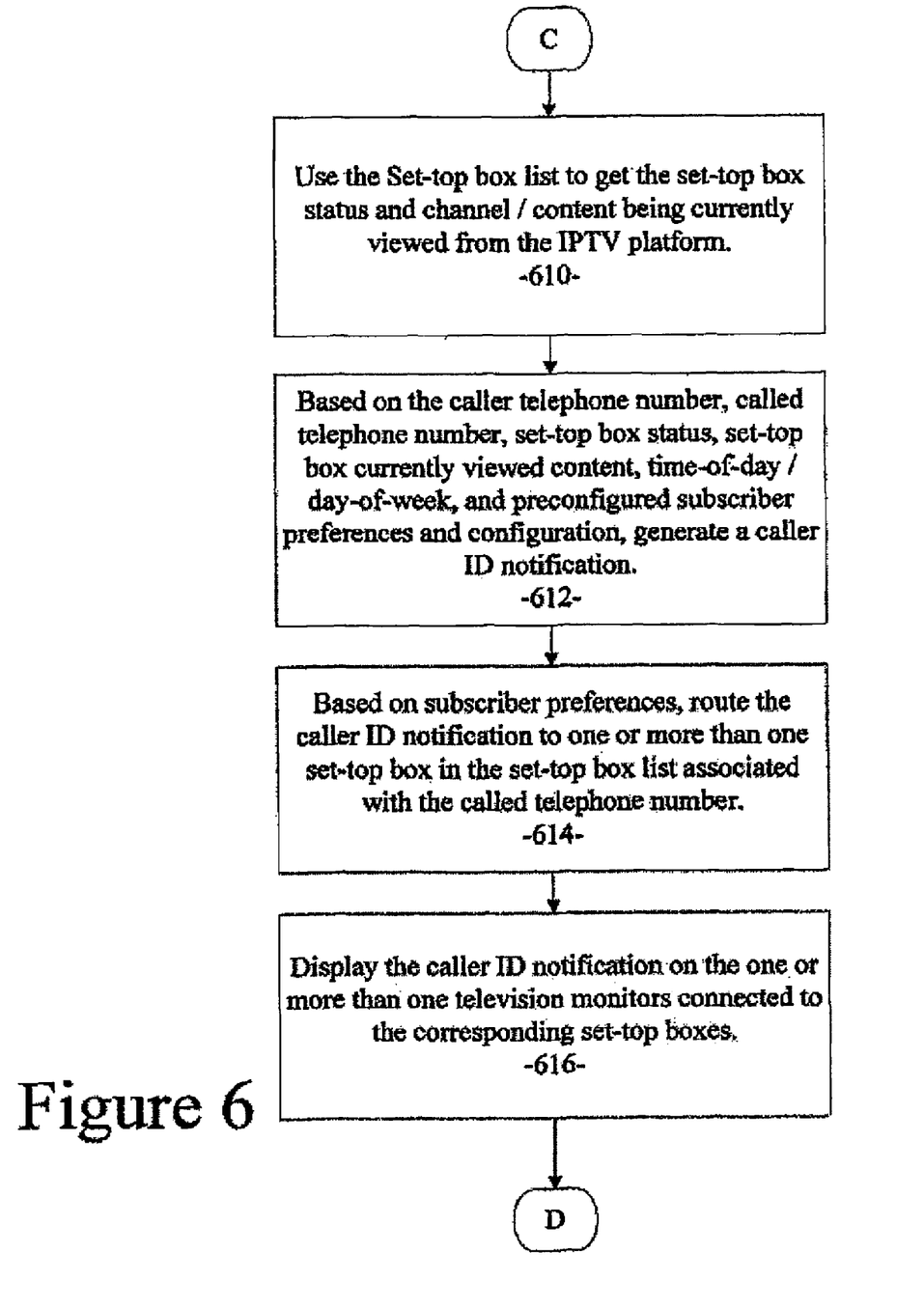

Referring to FIG. 6, processing for the incoming call notification continues at processing block 610. The set-top box identifier list obtained in processing block 316 is used to obtain the status and channel/content being currently viewed for each of the subscriber's (i.e. called party's) set-top boxes (processing block 610). Using a set-top box identifier, caller ID application server 150 can access IPTV platform 130 to obtain the set-top box status and channel/content information for set-top boxes 160 connected to IPTV platform 130 through residential gateway 140. In this manner, caller ID application server 150 can determine which of several possible subscriber set-top boxes may be active and what content is being currently viewed on each of the active subscriber set-top boxes. In processing box 612, caller ID application server 150 uses this information to generate a caller ID notification. In particular, caller ID application server 150 can use the caller telephone number, the called telephone number, the set-top box status, the content being currently viewed through the set-top box, the time of day and day of week, and preconfigured subscriber preferences to generate the caller ID notification (processing block 612).

In processing block 614, the generated caller ID notification is routed to one or more subscriber set-top boxes identified in the set-top box list associated with the subscriber's (i.e. called) telephone number. This caller ID notification routing is based on several subscriber configurable preferences and the previously obtained subscriber/set-top box information. For example, a subscriber can configure caller ID application server 150 to deliver caller ID notifications to a particular set-top box only during certain hours of the day or certain days of the week. In other cases, a subscriber can configure the system to deliver caller ID notifications to all subscriber set-top boxes at a particular subscriber location. Further, a subscriber can configure the system to deliver caller ID notifications to one or more subscriber set-top boxes, except during periods when particular identified channels or programming content is being viewed on a particular set-top box. In this manner, a subscriber can suspend caller ID notification during, for example, a particular sporting event or other programming during which the subscriber does not want to be disturbed with a caller ID notification.

In processing block 616, the caller ID notification is displayed on the television monitors connected to one or more of the subscriber's set-top boxes to which the caller ID notification was routed. Thus, as described above for an example embodiment, an incoming telephone call through one of telephone networks 105 activates one of triggers 107, which causes IMS 120 to send call information to caller ID application server 150, which generates the caller ID notification and selectively delivers the caller ID notification according to preconfigured subscriber preferences. As part of the caller ID notification selectively displayed on one or more of the subscriber's television monitors, the subscriber/television viewer is prompted to provide input in response to the caller ID notification. Such viewer input can be used to dismiss or remove the caller ID notification from the television screen, answer the incoming call, forward the incoming call to another telephone number or to voicemail, disable further caller ID notifications, or configure the caller ID application server 150 functionality. The handling of such viewer input is described in more detail in FIG. 7 starting at the bubble D.

Figure 7:
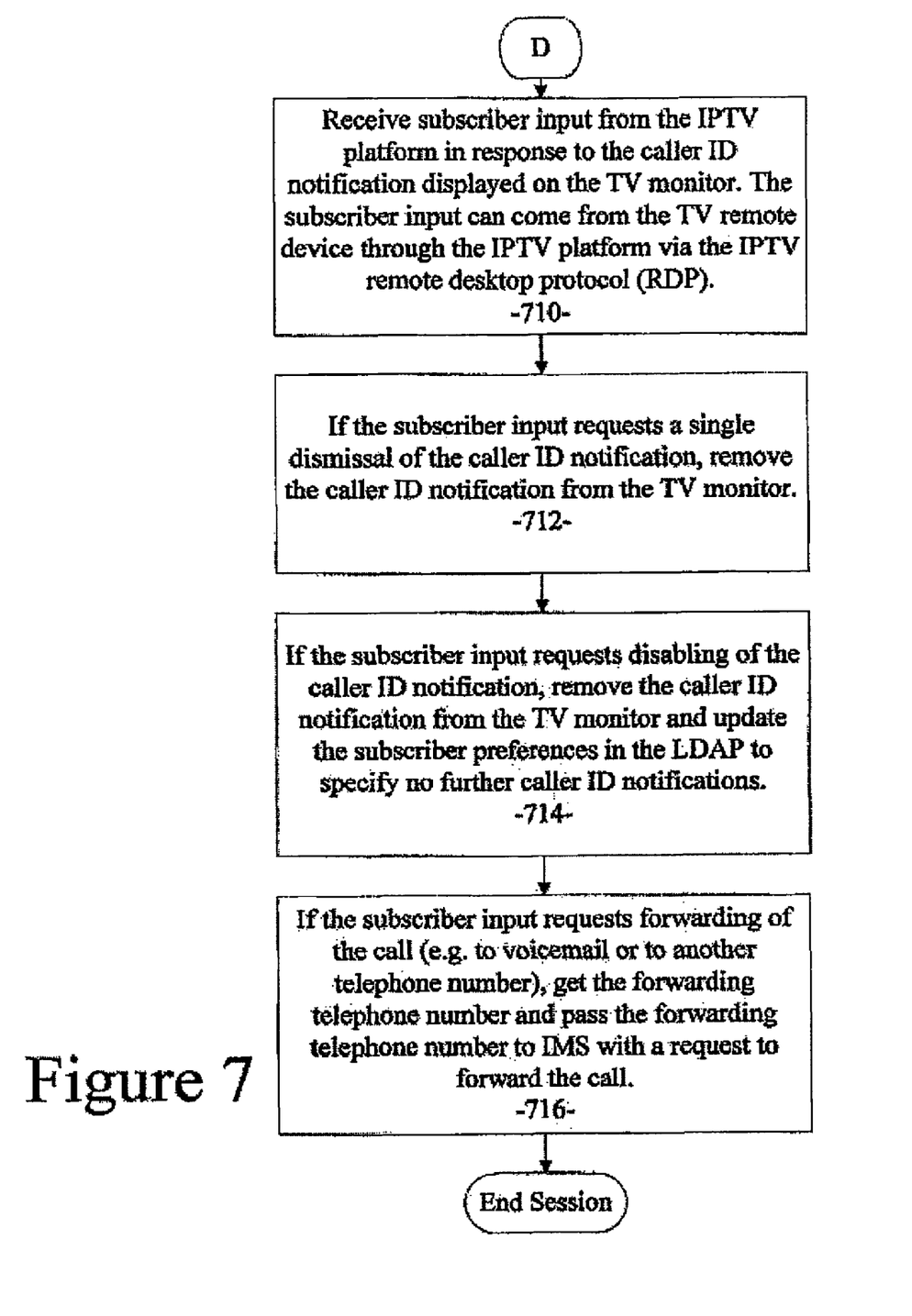

Referring to FIG. 7, processing for handling viewer input in an example embodiment is illustrated. In processing box 710, subscriber/viewer input is received by caller ID application server 150 through IPTV platform 130 in response to viewer activation of a soft button or the like displayed with the caller ID notification. Such viewer input can be received through television remote device 162 and the remote desktop protocol (RDP) of IPTV platform 130. If such viewer input indicates the subscriber/viewer's request for a single dismissal of the caller ID notification, caller ID application server 150 removes the caller ID notification from the television monitor (processing block 712). If such viewer input indicates the subscriber/viewer's request for disabling of the caller ID notification, caller ID application server 150 removes the caller ID notification from the television monitor and configures caller ID preference information in LDAP 115 to disable further caller ID notifications (processing block 714). If such viewer input indicates the subscriber/viewer's request for forwarding of the incoming call (e.g. to another telephone number, to voicemail, or the like), caller ID application server 150 obtains the forwarding telephone number from the subscriber or from preconfigured preferences and passes the fording telephone number to IMS 120 with a request to foreword to call as requested (processing block 716). Processing for the incoming telephone call session in the described example embodiment then terminates as illustrated in FIG. 7.

Although the system and method as described above is shown in an example form implemented in an IPTV distribution system, the disclosed system and method may, in another example embodiment, be implemented in a cable television system, in a broadcast television system, or in a satellite distribution system, or other distribution systems, for example a broadband wireless distribution system. In addition, according to another example embodiment, incoming telephone calls can be received through a variety of other conventional communication networks.

Figure 8:
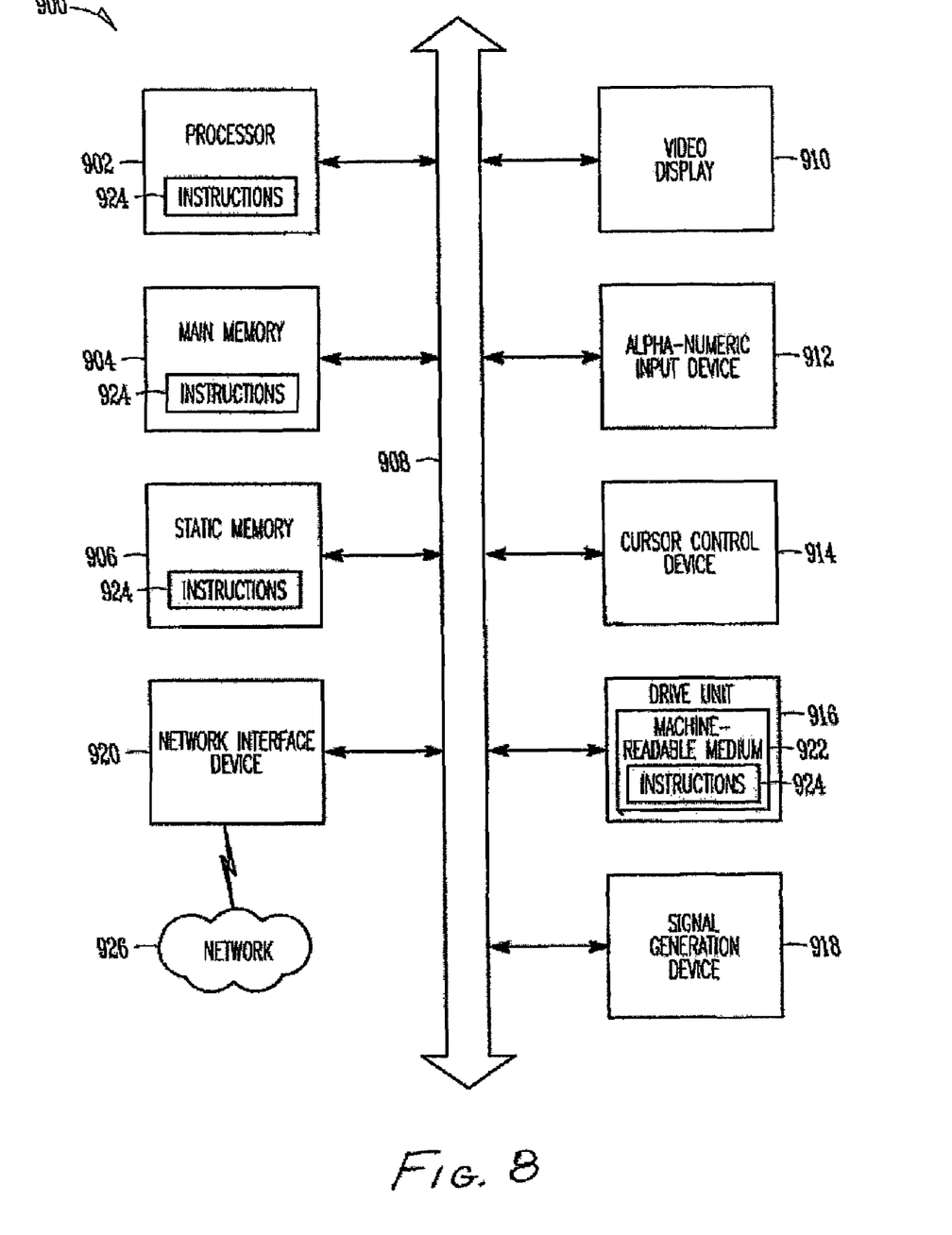
FIG. 8 illustrates an example embodiment of a computing system in accordance with the disclosed subject matter.

Referring now to FIG. 8, a diagrammatic representation of a machine is shown in the example form of a computer system 900 of a type sufficient for use in any of the example embodiments set forth herein. System 900 may include a set of instructions for causing the machine to perform any one or more of the methodologies discussed herein, that may be executed. In alternative embodiments, the machine operates as a standalone device or may be connected (e.g., networked)

to other machines. In a networked deployment, the machine may operate in the capacity of a server, a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904, and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation device 914 (e.g., a mouse), a disk drive unit 916, a signal generation device 918 (e.g., a speaker), and a network interface device 920.

The disk drive unit 916 includes a machine-readable medium 922 on which is stored one or more sets of instructions and data structures (e.g., software 924) embodying or utilized by any one or more of the methodologies or functions described herein. The software 924 may also reside, completely or at least partially, within the main memory 904, and/or within the processor 902, during execution thereof by the computer system 900. The main memory 904 and the processor 902 also constituting machine-readable media.

The software 924 may further be transmitted or received over a network 926 via the network interface device 920 utilizing any one of a number of well-known transfer protocols, for example, the hyper text transfer protocol (HTTP). While the machine-readable medium 922 is shown in an example embodiment to be a single medium, the term "machine-readable medium" as an article of manufacture should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the disclosed subject matter, or that is capable of storing, encoding, or carrying data structures utilized by or associated with such a set of instructions. The term "machine-readable medium" shall accordingly be taken to include, but not be limited to, solid-state memories, optical and magnetic media, and carrier wave signals.

Although the present specification describes components and functions implemented in the embodiments with reference to particular standards and protocols, the disclosed subject matter may be not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

Thus, as described above, an improved system and method for the notification, configuration, and management of telephone calls in a network environment using a television interface is disclosed. While the example embodiments herein are generally illustrated in the environment of an IPTV system, in an alternative embodiment a cable distribution system or satellite distribution system may be used instead. Such a system may or may not use IPTV methodologies. Further, the IPTV may be delivered over-the-air using, for example, broadband wireless telecommunications techniques.

Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

We claim:

1. A method comprising:
    receiving an incoming call message via a data interface upon activation of a trigger established with a voice communication network and activated when the voice communication network receives an incoming call to a destination identified by a pre-determined subscriber account;
    generating a call notification in response to the incoming call message; and
    routing the call notification to at least one set top box from a group of set-top boxes based on an identification of content being presented by the at least one set-top box, wherein the group of set-top boxes is associated with the pre-determined subscriber account, wherein the routing of the call notification is based on a pre-determined time period associated with the at least one set-top box.

2. The method as claimed in claim 1 wherein the receiving an incoming call message further includes receiving caller ID information.

3. The method as claimed in claim 2 further including:
    using the incoming caller ID information to obtain a caller name associated with the incoming call; and
    including the caller name in the call notification.

4. The method as claimed in claim 1 wherein the voice communication network is a POTS network.

5. The method as claimed in claim 1 wherein the voice communication network is a wireless network.

6. The method as claimed in claim 1 wherein the voice communication network is a voice-over-IP network.

7. The method as claimed in claim 1 wherein a list of set-top boxes includes unique identifiers for the group of set-top boxes at a subscriber location.

8. The method as claimed in claim 1 further including displaying the call notification on a television monitor.

9. The method as claimed in claim 1 further including receiving a control input from a television remote device.

10. The method as claimed in claim 9 further including removing the call notification from the television monitor upon receiving the control input.

11. The method as claimed in claim 9 further including forwarding the call upon receiving the control input.

12. An article of manufacture comprising at least one machine readable storage medium having one or more computer programs stored thereon and operable on one or more computing systems to:
- receive an incoming call message via a data interface upon activation of a trigger established with a voice communication network and activated when the voice communication network receives an incoming call to a destination identified by a pre-determined subscriber account;
- generate a call notification in response to the incoming call message; and
- route the call notification to at least one set top box from a group of set-top boxes based on an identification of content being presented by the at least one set-top box, wherein the group of set-top boxes is associated with the pre-determined subscriber account, wherein the routing of the call notification is based on a pre-determined time period associated with the at least one set-top box.

13. An article of manufacture according to claim 12 wherein the incoming call message includes caller ID information.

14. The article of manufacture according to claim 13 further operable to:
- use the incoming caller ID information to obtain a caller name associated with the incoming call; and
- include the caller name in the call notification.

15. The article of manufacture according to claim 12 wherein the voice communication network is a POTS network.

16. The article of manufacture according to claim 12 wherein the voice communication network is a wireless network.

17. The article of manufacture according to claim 12 wherein the voice communication network is a voice-over-IP network.

18. The article of manufacture according to claim 12 wherein a list of set-top boxes includes unique identifiers for the group of set-top boxes at a subscriber location.

19. The article of manufacture according to claim 12 further operable to display the call notification on a television monitor.

20. The article of manufacture according to claim 12 further operable to receive a control input from a television remote device.

21. The article of manufacture according to claim 20 further operable to remove the call notification from the television monitor upon receipt of the control input.

22. The article of manufacture according to claim 20 further operable to forward the call upon receipt of the control input.

23. A system comprising:
- a voice communication network;
- a trigger operably coupled with the voice communication network, the trigger being activated when the voice communication network receives an incoming call to a destination identified by a pre-determined subscriber account; and
- a caller ID application server operable to:
  - receive an incoming call message via a data interface upon activation of the trigger;
  - generate a call notification in response to the incoming call message; and
  - route the call notification to at least one set top box from a group of set-top boxes based on an identification of content being presented by the at least one set-top box, wherein the group of set-top boxes is associated with the pre-determined subscriber account, and wherein the routing of the call notification is based on a pre-determined time period associated with the at least one set-top box.

24. A system according to claim 23 wherein the incoming call message includes caller ID information.

25. The system according to claim 24 further operable to:
- use the incoming caller ID information to obtain a caller name associated with the incoming call; and
- include the caller name in the call notification.

* * * * *

UNITED STATES PATENT AND TRADEMARK OFFICE
CERTIFICATE OF CORRECTION

| | |
|---|---|
| PATENT NO. | : 8,098,805 B2 |
| APPLICATION NO. | : 12/419928 |
| DATED | : January 17, 2012 |
| INVENTOR(S) | : Ryan Van Wyk, Brian Bearden and Scott Steinbrueck |

It is certified that error appears in the above-identified patent and that said Letters Patent is hereby corrected as shown below:

On the title page after item (65), column 1, please insert --Related U.S. Application Data
(63) Continuation of Application No. 11/405,846, filed on April 17, 2006, now Pat. No. 7,515,698--.

Signed and Sealed this
Third Day of May, 2016

Michelle K. Lee
*Director of the United States Patent and Trademark Office*